(12) United States Patent
Lee et al.

(10) Patent No.: US 6,359,845 B1
(45) Date of Patent: Mar. 19, 2002

(54) OPTICAL PICKUP APPARATUS

(75) Inventors: Man Hyung Lee; Chul Min Kim, both of Seoul; Hyun Joon Kim, Kyunggi-do, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/365,716

(22) Filed: Aug. 3, 1999

(30) Foreign Application Priority Data

Aug. 4, 1998 (KR) ............................................ 98-31760

(51) Int. Cl.[7] .................................................. G11B 7/09
(52) U.S. Cl. ............................... 369/44.23; 369/112.01; 369/94; 369/44.37
(58) Field of Search ........................... 369/44.12, 44.23, 369/44.25, 44.26, 44.27, 44.28, 44.37, 44.38, 53.1, 53.28, 112.01, 116, 93, 94

(56) References Cited

U.S. PATENT DOCUMENTS

| 5,933,401 A | * | 8/1999 | Lee et al. | ............ | 369/44.23 X |
| 6,043,912 A | * | 3/2000 | Yoo et al. | ............ | 369/44.12 X |
| 6,211,511 B1 | * | 3/2001 | Shih et al. | .............. | 369/103 X |

FOREIGN PATENT DOCUMENTS

| JP | 6259804 | 9/1994 |
| JP | 7065407 | 3/1995 |
| JP | 8055363 | 2/1996 |
| JP | 9050647 | 2/1997 |
| JP | 09185839 | 7/1997 |
| JP | 09198704 | 7/1997 |

* cited by examiner

Primary Examiner—Muhammad Edun

(57) ABSTRACT

An optical pickup apparatus that is capable of recording and reproducing various types of optical discs having a recording format, such as a different substrate thickness, etc., without an additional aperture number control device. In the apparatus, at least two light sources generate a different wavelength of lights. A focusing optical system focuses a light from the light source onto the optical recording medium. A receiving optical system receives a light reflected from the recording medium. The focusing optical system is configured in such a manner to generate a predetermined range of aberration in a light spot formed on the optical medium by the lights from any one of the light sources. Since the apparatus can access recording media having a different recording format by using an optical system and an aberration optimized for a single optical recording medium without an additional aperture number control device, so that its configuration is simplified.

14 Claims, 8 Drawing Sheets

OPTICAL PICKUP APPARATUS

BACKGROUND OF THE INVENTION

1. Field of the Invention

This invention relates to an optical pickup apparatus that can be adapted for various types of optical recording media having a different recording format such as a substrate thickness.

2. Description of the Related Art

Generally, an optical recording/reproducing apparatus driving disc-type media, such as compact disc(CD), etc., which are well known as recording media making use of a laser light beam, records or reproduce data by irradiating a laser beam onto the recording face of a disc with rotating the disc. To this end, the optical recording/reproducing apparatus includes an optical pickup for irradiating a laser beam generated from a light source, such as a semiconductor laser, onto the recording face of the optical disc using optical system devices such as an objective lens, etc.

Recently, there has been commercially available a digital versatile disc(DVD) that is capable of a larger amount of information than the conventional CD. The DVD is usually designed in consideration of a light source generating a different number of aperture and a different wavelength from the CD. In this case, the wavelength and the number of aperture of a light beam are related to a size of beam spot and which is adopted in consideration of the size of beam spot. The size of beam spot is selected from the standpoint of minimizing an effect caused by a cross talk between signal tracks defined on the recording face of the optical disc. Accordingly, since the DVD with a larger recording density than the CD has a small track pitch the size of beam spot, its beam spot size also must be smaller than that of the CD. In this case, a scheme making use of a shortened wavelength and an increased aperture number can be considered so as to reduce the size of beam spot. This is caused by a fact that the size of beam spot is directly proportional to the wavelength of the light beam while being inversely proportional to the number of aperture as seen from the following formula:

$$d = k\frac{\lambda}{NA} \quad (1)$$

wherein d represents a size of beam spot, k does a constant, $\lambda$ does a wavelength of a light beam, and NA does the number of aperture of an objective lens. It can be seen from the formula (1) that the DVD adopts a short wavelength of light beam and a large number of apertures so as to obtain a smaller size of beam spot than the CD. For instance, an optical pickup accessing the CD uses a light beam with a wavelength ($\lambda$) of 780 nm and an objective lens with the number of aperture of 0.45, whereas an optical pickup accessing the DVD uses a light beam with a wavelength ($\lambda$) of 650nm and an objective lens with the number of aperture of 0.6. Also, in the DVD, a characteristic of a light beam becomes sensitive to a thickness of the disc as the number of aperture of a light beam, so that a depth of its recording face, that is, a depth of its light transmission layer is set to have a smaller value than that of the CD. In other words, since a noise component is increased so that data cannot be recorded or reproduced as it is due to an increase in the optical aberration when a light transmission layer with the same thickness as the CD is transmitted by means of an objective lens with the number of aperture of 0.6, the thickness of the light transmission layer in the DVD is set to have a smaller value than that in the CD. For instance, a light transmission layer of the CD has a thickness of 1.2 mm while a light transmission layer of the DVD has a half the thickness thereof, that is, a thickness of 0.6 mm.

An optical pickup for changeably accessing such CD and DVD must includes two light sources generating a different wavelength of light beams and two objective lenses with a different number of aperture. In the case where an optical pickup is provided with two light sources and two objective lenses, it has problems in that a dimension of the optical pickup is enlarged, that its structure becomes complicated, and that a manufacturing cost thereof increases. In order to solve the problems, there has been studied an optical pickup that is capable of making use of a single light source and appropriately controlling the number of aperture of the objective lens depending on the corresponding disc to thereby access the CD and the DVD.

For example, Japanese Patent Laid-open Gazette No. Pyung 9-185839 has disclosed an optical pickup that can access two types of optical discs with a different thickness of light transmission layers by controlling the number of aperture of an objective lens employing a liquid crystal shutter and a polarizing filter. The optical pickup controls the number of aperture of the objective lens into two modes by turning on or off the liquid crystal shutter depending on whether or not a voltage is applied, to thereby selectively changing a polarization characteristic of a light beam generated from a light source, and by allowing the polarizing filter to selectively shut out a portion of light beam in accordance with the polarization characteristic of a light beam changed by means of the liquid shutter. Also, Japanese Patent Laid-open Gazette No. Heisei 9-198704 has disclosed an optical pickup that is capable of accessing two types of optical discs by providing two objective lenses with a single lens supporting member in the Twin-lens system to thereby switch a position of the objective lens in accordance with a rotation of the lens supporting member.

However, since the optical pickup apparatus of aperture number control system or twin lens system as mentioned above requires additional components, it has a problem in that its configuration is complicated and its manufacturing cost rises. Also, in the above-mentioned optical pickup apparatus, the aperture number control device is assembled to the actuator along with the objective lenses or the twin lens is assembled thereto, so that a load in an actuator operator is increased to deteriorate its sensitivity. Such sensitivity deterioration in the actuator operator acts as an obstacle factor in making a high multiple speed of optical pickup.

SUMMARY OF THE INVENTION

Accordingly, it is an object of the present invention to provide an optical pickup apparatus that is capable of recording and reproducing various types of optical discs having a different recording format such as a substrate thickness.

In order to achieve these and other objects of the invention, an optical pickup apparatus according to one aspect of the present invention includes at least two light sources for a different wavelength of lights; a focusing optical system for focusing the light from the light source onto the optical recording medium; and a receiving optical system for receiving a light reflected from the optical recording medium, wherein the focusing optical system is configured in such a manner to generate a predetermined range of aberration in a light spot formed on the optical medium by the lights from any one of the light sources.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
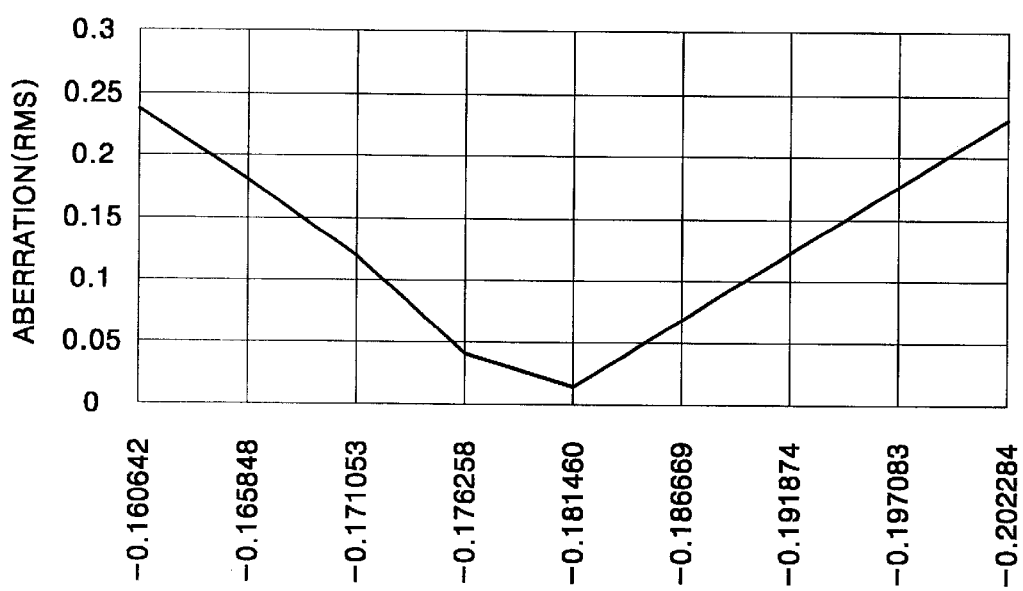
FIG. 1 is a graph showing an aberration change for each magnification in an objective lens.
Figure 2:
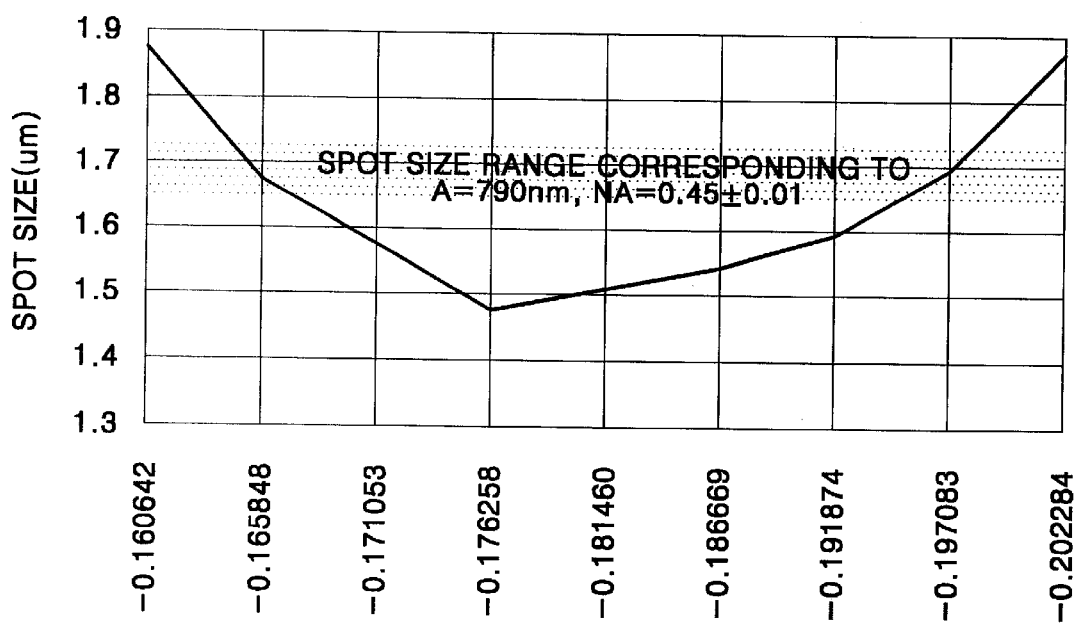
FIG. 2 is a graph showing an optical spot size change for each magnification in an objective lens.

A background related with an advent of the present invention will be described prior to an explanation as to embodiments of the present invention. The present invention was derived from an experiment of measuring a spot size (i.e., diameter) of an optical spot formed on a disc by adding an optical system, which is configured suitably for accessing any one of a number of discs having different substrate thickness and recording format, to another disc light source in such a manner to have a changeable luminescence point and by varying a distance between a luminescence point of the different disc light source and a disc in accordance with a magnification of an objective lens. In order to carrying out this experiment, we has been installed a light source for CD in an optical system configured suitably for accessing a DVD. Then we measures a variation state in diameter of an optical spot formed on the CD and a variation state in an aberration with controlling a distance between a luminescence point the light source for CD and a disc, i.e., a magnification of the objective lens. Accordingly, an aberration characteristic of a light for CD according to a magnification as shown in FIG. 1 and a spot size characteristic of a light for CD changing in accordance with a magnification as shown in FIG. 2. FIGS. 1 and 2 are obtained a optical system including a objective lens which has a focusing distance of 3.37 mm for a lights for the DVD, i.e., for a wave length of 650 nm. It can be seen from FIG. 1 that an aberration has a minimum value of 0.02 when a luminescence point of a light source for CD is distant from a disc by a distance corresponding to a magnification of 0.181460. As a space between a luminescence point of a light source for CD and a disc is reduced in comparison to a distance corresponding to a magnification of 0.181460, an aberration of a light for CD increases. Also, an aberration of a light for CD increases when a space between a luminescence point of a light source for CD and a disc is enlarged in comparison to a distance corresponding to a magnification of 0.181460. Meanwhile, FIG. 2 shows that an optical spot having a minimum diameter of 1.48 $\mu$m is formed on a disc when a luminescence point of a light source for CD is distant from a disc by a distance corresponding to a magnification of 0.176258. A light spot size increases as a distance between a luminescence point of a light source for CD and a disc is reduced or enlarged in comparison to a distance corresponding to a magnification of 0.176528. In addition, the light spot has a size of 1.640 $\mu$m to 1.720 $\mu$m equal to an light spot formed on a disc by an optical system for CD when a distance between a luminescence point of a light source for CD and a disc has a distance range corresponding to a magnification of 0.164 to 0.167 or a distance range corresponding to a magnification of 0.193 to 0.198. As a result, it can be seen from FIG. 1 and FIG. 2 that an optical spot having the same size as an optical spot formed by an optical system for CD can be obtained by installing a light source for CD at an optical system for DVD in such manner that an aberration is generated from a light for CD, that is, by controlling a distance between a luminescence point of a light source for CD added to an optical system for DVD and a disc.

Figure 3:
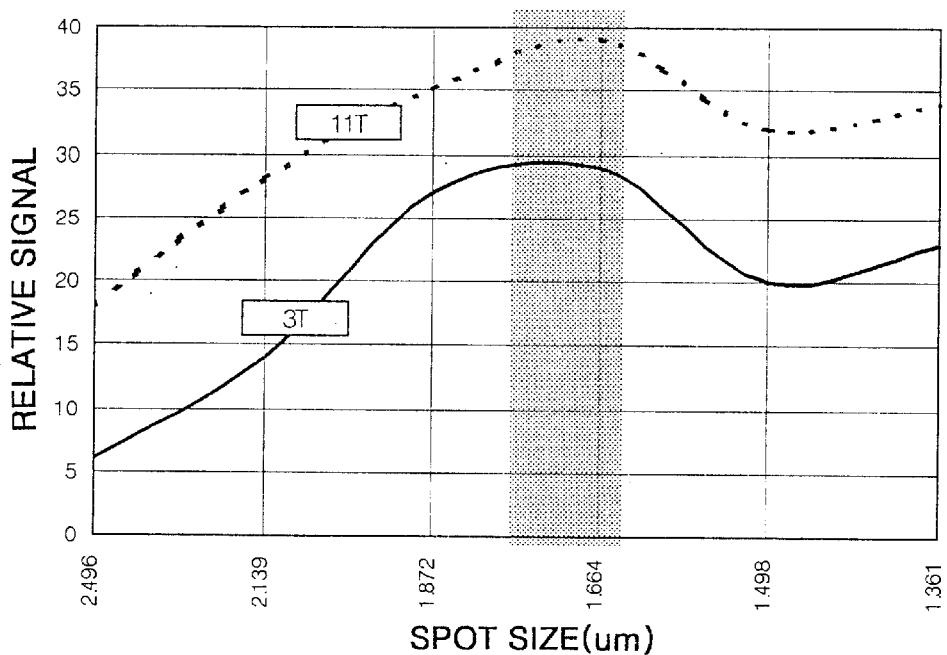
FIG. 3 is a graph representing the relationship of a reproducing signal size to an optical spot size according to a magnification adjustment.
Figure 4:
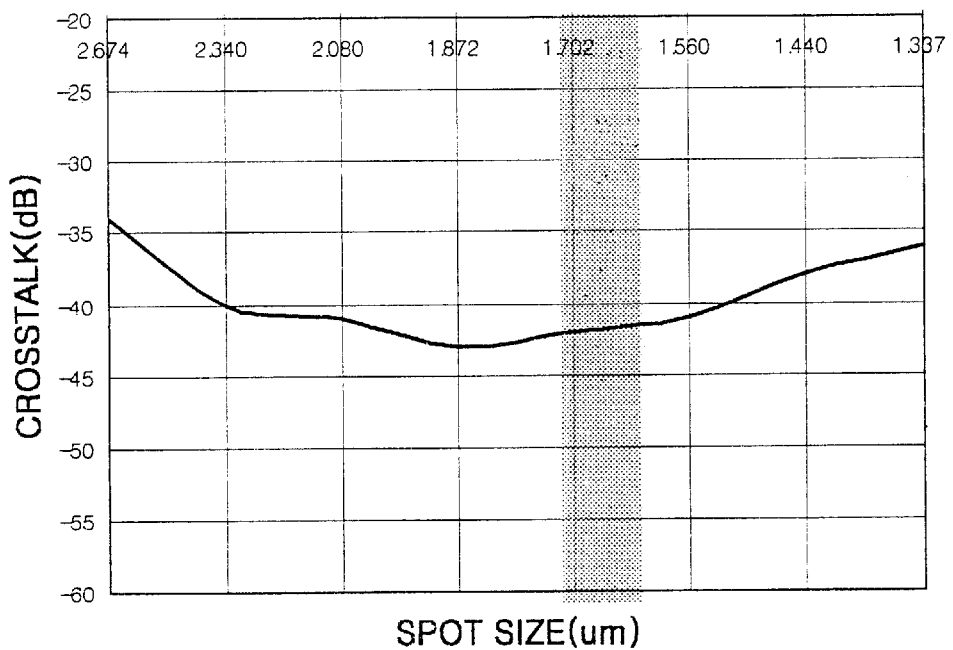
FIG. 4 is a graph representing the relationship of a cross talk component to an optical spot size according to a magnification adjustment.
Figure 5:
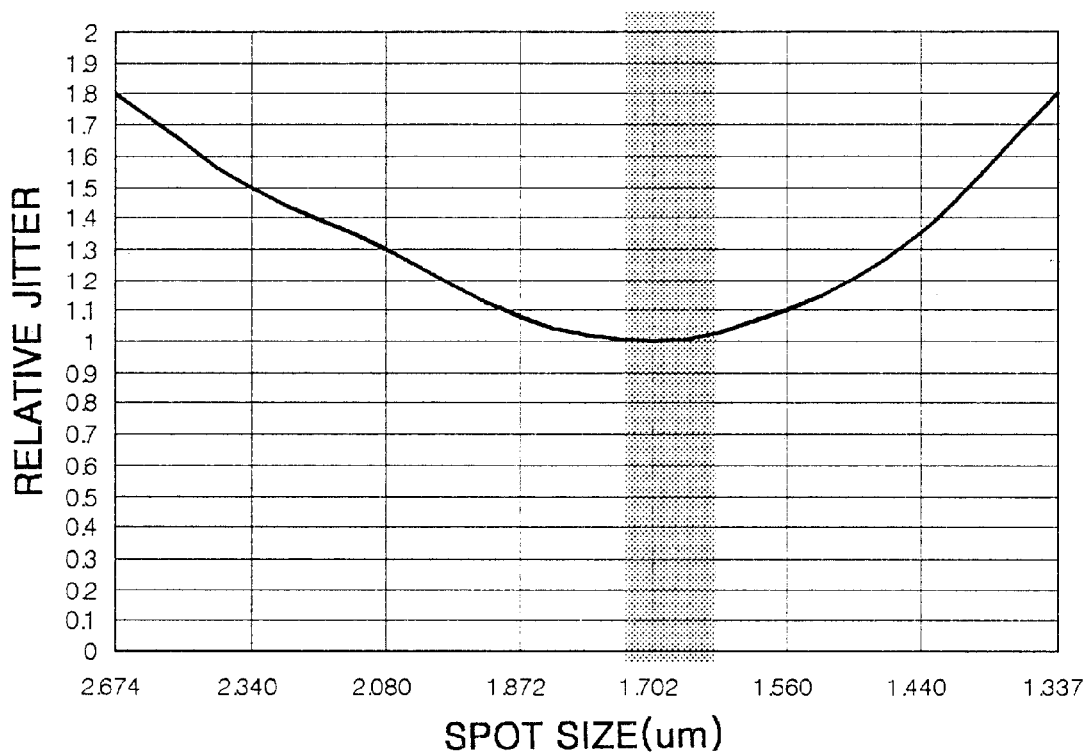
FIG. 5 is a graph representing the relationship of a jitter amount to an optical spot size according to a magnification adjustment.
Figure 6A:
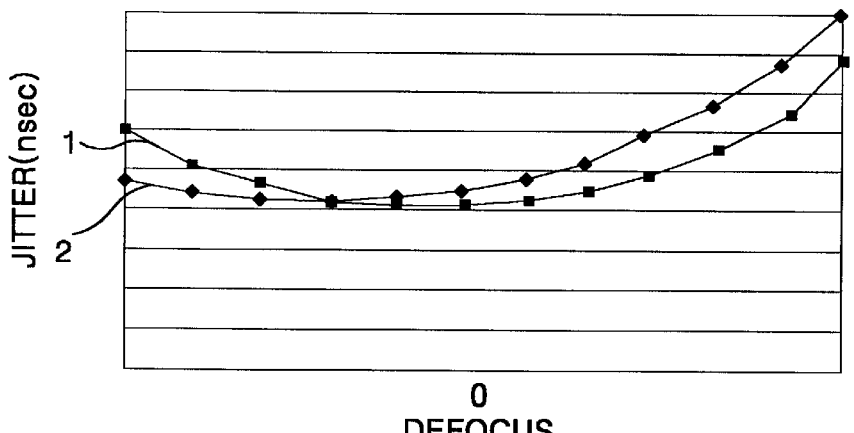
FIG. 6A is a graph representing the relationship of a jitter amount to a defocus of a reproducing signal using an optical spot from an optical system for a CD and an optical spot from an optical system allowing an aberration to be generated from a light for a CD.
Figure 6B:
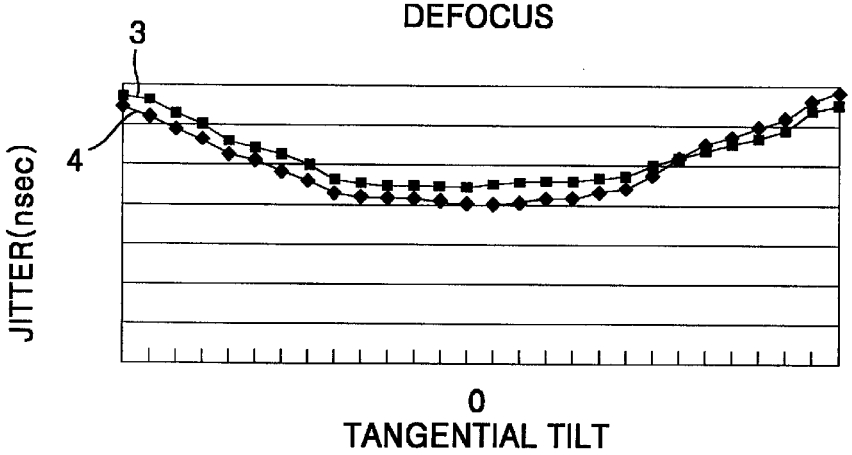
FIG. 6B is a graph representing the relationship of a jitter amount to a tangential tilt amount of said reproducing signal.
Figure 6C:
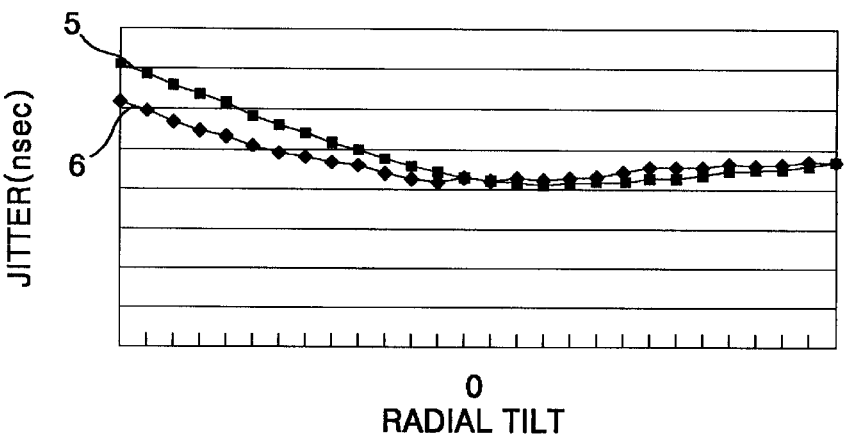
FIG. 6C is a graph representing the relationship of a jitter amount to a radial tilt amount of said reproducing signal.

Further, we measures a variation state in a size of a reproducing signal picked up by a light spot, a variation state in a cross talk component and a variation state in a jitter amount with changing a magnification, i.e., gradually decreasing a size of a light spot, as shown in FIG. 2. Accordingly, a reproducing signal characteristic according to a size of a light spot as shown in FIG. 3, a cross talk component characteristic changing in accordance with a light spot size as shown in FIG. 4, and a jitter amount characteristic changing in accordance with a light spot size as shown in FIG. 5. It can be seen from FIG. 3 that, when a distance between a luminescence point of a light source for CD added to an optical system for DVD and a disc is controlled such that a light spot has a size of 1.640 $\mu$m to 1.720 $\mu$m, that is, such that it has the same size as a light spot formed on the disc by an optical system for CD, a size of a reproducing signal picked up by the light spot becomes a maximum state. When pits having 3 T and 11 T is reproduced from the disc by a light spot having said size range, a maximum size of reproducing signal can be obtained. In addition, FIG. 4 and FIG. 5 show that a cross talk component and a jitter amount included in a reproducing signal detected by a light spot having said size range are very small to have no practical problem. As a result, when a CD is reproduced by a light spot obtained by installing a light source for CD at an optical system for DVD in such a manner that an aberration is generated from a light for CD, that is, by controlling a distance between a luminescence point of a light source for CD added to an optical system for DVD and a disc, a reproducing signal characteristic and cross talk and jitter amount characteristics identical to a light spot formed by an optical system for CD can be obtained. Furthermore, FIGS. 6A to 6C compare a characteristic of a reproducing signal picked up by a light spot equivalent to a light spot formed by an optical system for CD by controlling a distance between a luminescence point of a light source for CD added to an optical system for DVD, hereinafter referred to as "the present reproducing signal", with that of a reproducing signal picked up by a light spot obtained by an optical system for CD, hereinafter referred to as "the conventional reproducing signal". FIG. 6A represents the relationship of a jitter amount to a defocus of the reproducing signal. FIG. 6B represents the relationship of a jitter amount to a tangential tilt amount to a jitter amount of the reproducing signal. FIG. 6C represents the relationship of a jitter amount to a radial tilt amount of the reproducing signal. It can be seen from FIG. 6A that a defocus characteristic of the present optical system is analogous to that of the optical system for the CD although an optimized focus point moves when the present reproducing signal 1 is compared to the conventional reproducing signal 2. It can be seen from FIGS. 6B and 6C that the present reproducing signals 3 and 5 and the conventional reproducing signals 4 and 6 are analogous in a tilt window characteristic with respect to the tangential direction and the radial direction. As a result, FIGS. 6A to 6C show that, when a CD is reproduced by a light spot obtained by installing a light source for CD at an optical system for DVD in such a manner that an aberration is generated from a light for CD, that is, by controlling a distance between a luminescence point of a light source for CD added to an optical system for DVD and a disc, the similar defocus and tilt window characteristics as a light spot formed by an optical system for CD can be obtained.

As described above, the present invention is capable of changeably accessing both a DVD and a CD without a separate aperture number control device by installing a light source for CD to an optical system for DVD additionally in such a manner that an aberration is generated from a light for CD. Accordingly, the configuration of an optical pickup capable of changeably accessing both the DVD and the CD can be simplified. Such an effect of the present invention will be more apparent from the following detailed explanation as to embodiments of the present invention.

Figure 7:
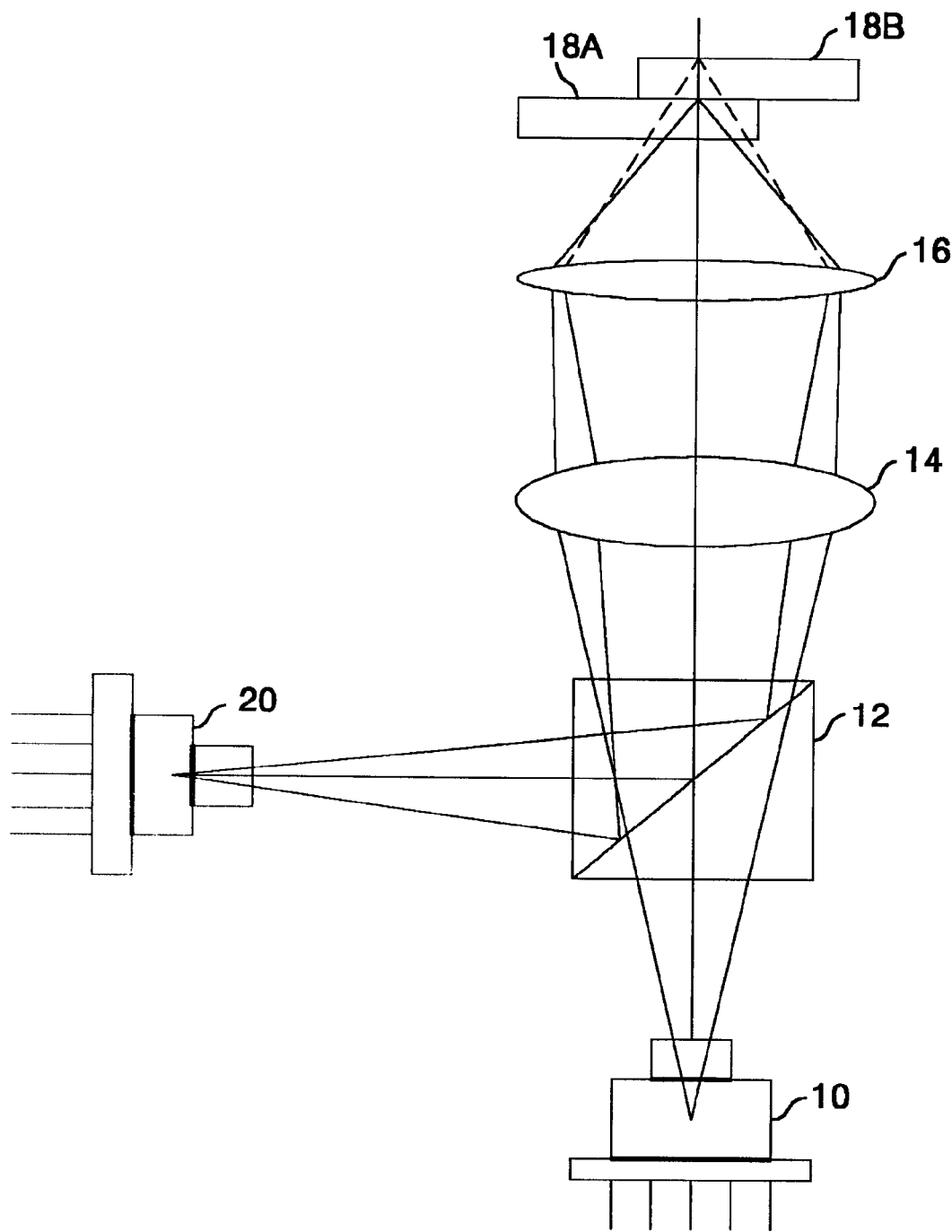
FIG. 7 is a schematic view showing the configuration of an optical pickup apparatus according to a first embodiment of the present invention.
Figure 8:
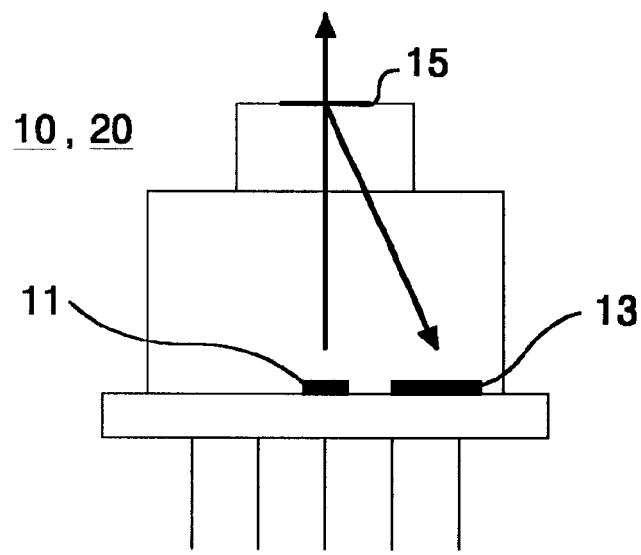
FIG. 8 is a detailed view showing the configuration of the hologram unit in FIG. 7.

Referring now to FIG. 7, there is shown an optical pickup apparatus according to a first embodiment of the present invention. The optical pickup apparatus includes a first hologram unit 10 for generating a light beam with a first wavelength(i.e., about 650 nm) and for converting a light beam reflected and received from a DVD 18a into an electrical signal, a second hologram unit 20 for generating a light beam with a second wavelength(i.e., about 780 nm) and for converting a light beam reflected and received from a CD 18b into an electrical signal, and an objective lens 16 for focusing an incident light beam onto the recording face of the CD 18b or the DVD 18a, a beam splitter 12 for selectively transmitting or reflecting light beams from the first and second hologram units 10 and 20, and a collimator lens 14 arranged between the beam splitter 12 and the objective lens 16 to progress a light beam from the first hologram unit 10 in parallel. As shown in FIG. 8, the first hologram unit 10 includes a laser diode 11 for generating a light beam, a photo detector 13 for detecting a reflective light beam to convert it into an electrical signal, and a hologram 15 for diffracting a reflective light beam to progress it toward the photo detector 13. The laser diode 11 generates a first waveform of light beam. The hologram 15 transmits a light beam generated from the laser diode 11 as it is, whereas it diffracts a reflective light beam from the DVD 18a to progress it toward the photo detector 13. The photo detector 13 detects a reflective light beam and converts the same into an electrical signal, i.e., a current signal. The photo detector 13 further includes a current/voltage converting circuit and an amplifying circuit so as to convert a current signal into a voltage signal and thereafter amplify and output the same. The current/voltage converting circuit and the amplifying circuit are separated such that they are included in an external circuit of the pickup. The beam splitter 12 transmits a light beam received from the first hologram unit 10 as it is to progress the received light beam toward the collimator lens 14, and transmits a reflective light beam from the DVD 18a as it is to progress the light beam toward the first hologram unit 10. The collimator lens 14 allows a divergent light beam from the beam splitter 12 to be progressed in a parallel light beam. The objective lens 16 focuses a light beam received from the collimator lens 14 onto the recording face of the DVD 18a and progresses a light beam reflected from the recording face of the DVD 18A toward the collimator lens 14. Herein, the collimator lens 14 and the objective lens 16 optimizes an aberration correcting state of the lenses including a used wavelength, the number of aperture and a thickness of the disc such that a suitable size of optical spot can be formed on the recording face of the DVD 18a, thereby configuring a no aberration optical system.

Figure 9:
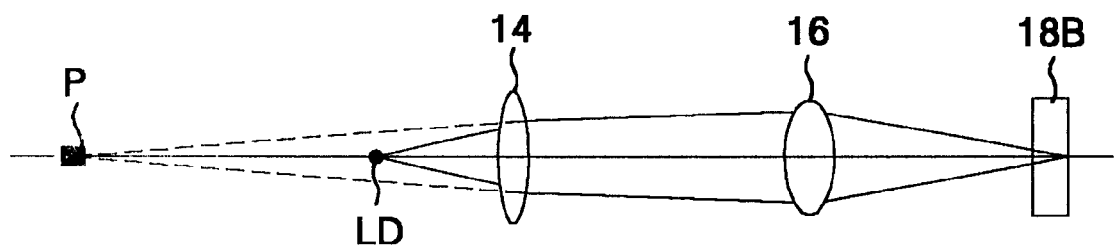
FIG. 9 is a view for explaining a reproducing principle of the CD in FIG. 8.

The second hologram unit 20 has the same configuration and function as the first hologram unit 10 except that a laser diode thereof generates a light beam with a wavelength of 780 nm suitable for the CD 18b. The second hologram unit 20 generating this light beam for CD is arranged in such a manner to generate a desired spherical aberration as mentioned above. In this case, the second hologram unit 20 can be installed in such a manner that a luminescence point of the laser diode is located at nearer or more distant position than a focus position of the collimator lens 14. It is preferable to install the second hologram unit 20 in such a manner that a luminescence point of the laser diode is located more nearly than a focus position of the collimator lens 14. At this time, a light beam generated from the laser diode of the second hologram unit 20 is incident to the objective lens 16 via the collimator lens 14 in a shape of somewhat divergent light as shown in FIG. 9. A light incident to the objective lens 16 in a shape of somewhat divergent light via the collimator lens 14 in this manner is radiated at a virtual object point as shown in FIG. 9 to show the same refraction characteristic as a light incident to the objective lens 16 and is focused on the recording face of the CD 18b. In other words, a distance between a luminescence point of the laser diode in the second hologram unit 20 and the CD 18b is more shortened than a distance from the virtual object point until the CD 18b corresponding to a magnification of the objective lens. This results from an aberration of a light beam for CD outputted from the laser diode of the second hologram unit 20 being compensated by the collimator lens 14. Accordingly, in order to obtain a light beam spot with a size as mentioned in FIG. 2, a distance between the objective lens 16 and the collimator lens 14 must be controlled appropriately depending on a distance between a luminescence point of the laser diode in the second hologram unit 20 and the objective lens 16. As a result, a light beam for CD is focused into a desired size of light spot on the recording face of the CD 18b via an optical system for DVD having a desired spherical aberration for its wavelength. Then, the optical system for DVD controls a distance between the collimator 14 and the objective lens 16 in accordance with a predetermined distance between a luminescence point of laser diode in the second hologram unit 20 and the disc. The predetermined distance is set to cause the desired spherical aberration. The beam splitter 12 reflects a light beam received from the second hologram unit 20 to progress it toward the collimator lens 14 and, at the same time, reflects a reflective light beam from the CD 18b to progress it into the second hologram unit 20.

Figure 10:
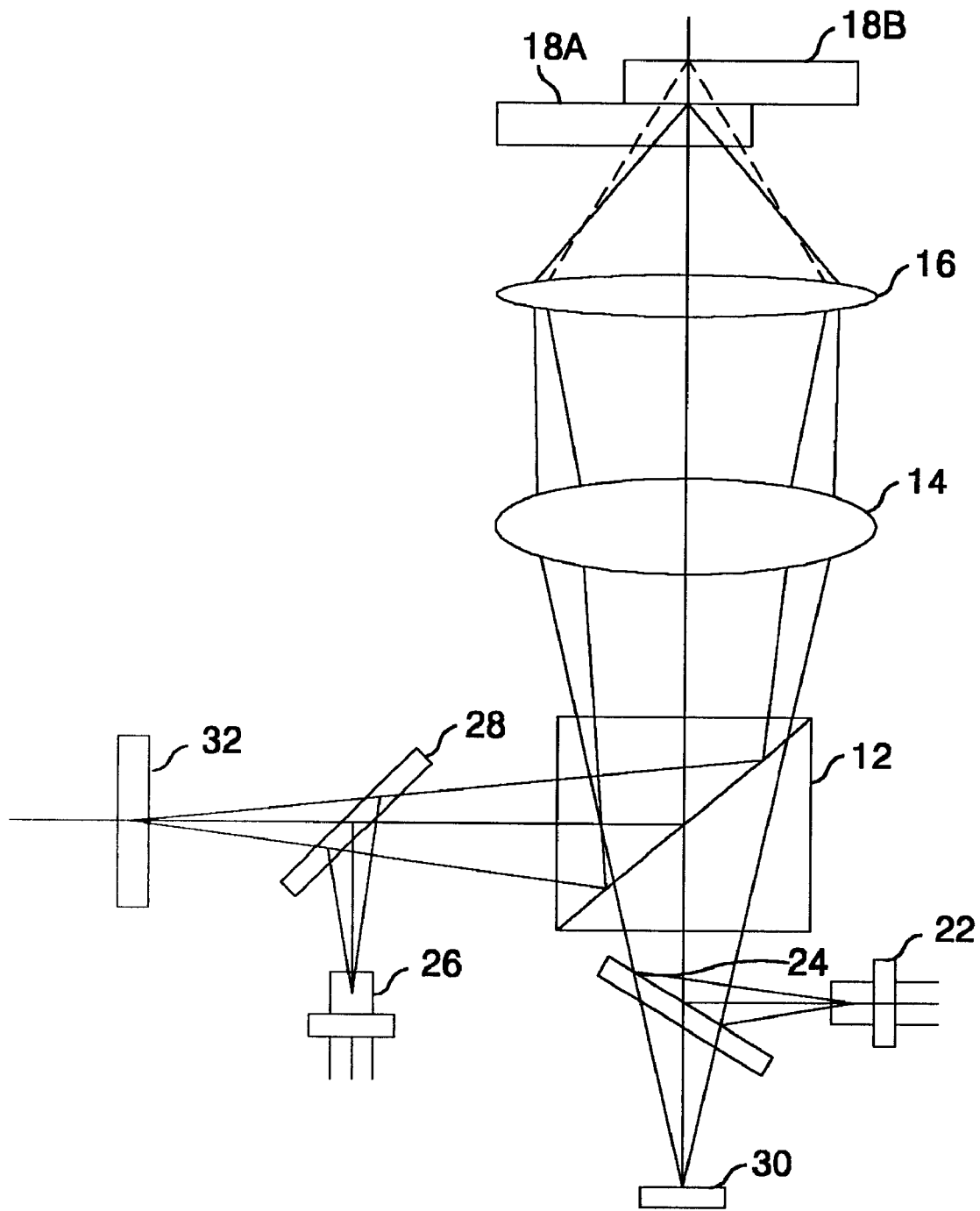
FIG. 10 is a schematic view showing the configuration of an optical pickup apparatus according to a second embodiment of the present invention.

Referring to FIG. 10, there is shown an optical pickup apparatus according to a second embodiment of the present invention. The optical pickup apparatus of FIG. 10 has the same construction elements as the optical pickup apparatus in FIG. 7 except that a light source for DVD 22 and a photo detector 30 are separated from a light source for CD 26 and a photo detector 32 and that it further includes half mirrors 24 and 28 for progressing a reflective light beam into the photo detectors 30 and 32. The light source for CD 26 is arranged at a position where a desired spherical aberration is generated as mentioned above. The optical pickup apparatus not only accesses the DVD 18a using a no aberration optical system, but also accesses the CD 18b using a light source for CD arranged in such a manner to generate a desired spherical aberration at a DVD optical system.

Meanwhile, when a light spot size is controlled using a spherical aberration as mentioned above, an effect of the spherical aberration is extended into the photo detector to thereby increase a defocus upon detection of a focus error signal. An increase in the defocus according to an effect of the spherical aberration can be corrected by a position adjustment of the photo detector 32 for a CD or a position adjustment, etc. of a sensor lens when the sensor lens(not shown) is used. Also, when a light source and a photo detector are built within a single package like the hologram unit 20 shown in FIG. 6, a defocus caused by an effect of the spherical aberration can be corrected by a compensation method of generating a defocus in the reverse direction upon assembly of the hologram unit 20 for a CD. Accordingly, the present invention is capable of performing a servo control by detecting a stable servo signal without any affect of the spherical aberration during the recording or the reproduction of the CD.

The objective lens is designed by a perfect lens at a usual design step, but it has an astigmatism, a comma aberration and a spherical aberration due to an accumulation of a spherical error, a non-spherical error, a thickness error and a refraction index error in a material, etc. in the fabrication process. Accordingly, it is preferable to simultaneously utilize a method of controlling a distance from a luminescence point of a light source in the CD optical system until a position at which a light spot is formed on the disc along with a residual spherical aberration of the objective lens itself. In this case, a desired light spot size is obtained by minimizing a residual spherical aberration of the objective lens as much as possible and thereafter controlling a distance from a luminescence point of a light source in the CD optical system until a position at which a light spot is formed on the disc in consideration of the minimized residual spherical aberration.

As described above, the optical pickup apparatus according to the present invention is capable of changeably accessing both a DVD and a CD by making use of an optical system optimized for a use of DVD as well as an optical source for CD installed at the optical system for DVD in such a manner that an aberration is generated from a light for CD. Accordingly, an optical pickup apparatus according to the present invention does not require an additional aperture number control device for a changeability of the DVD and the CD, so that its configuration can be simplified and its manufacturing cost can be reduced in comparison to the conventional DVD/CD compatible optical pickup.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An optical pickup apparatus for recording and reproducing various types of optical recording media having different recording formats such as different substrate thickness, comprising:

at least two light sources producing different wavelengths of light forming a light spot on an optical medium;

a focusing optical system for focusing the light from the light sources onto the optical recording medium, wherein the focusing optical system is configured to generate a predetermined range of aberration in the light spot; and a receiving optical system for receiving light reflected from the optical recording medium.

2. An optical pickup apparatus as claimed in claim 1, wherein the light spot has a diameter larger than that of a light spot formed in case that an aberration is not generated.

3. An optical pickup apparatus as claimed in claim 1, wherein the focusing optical system includes a collimator and an objective lens positioned apart from each other by a proper distance in order to form the light spot.

4. An optical pickup apparatus as claimed in claim 1, wherein a luminescence point of any one of the light sources is positioned at a position within a focusing distance of collimator.

5. The focusing optical system as claimed in claim 1, wherein the range of aberration is predetermined so as to produce a light spot of a size equal to a light spot formed on optical recording media.

6. The focusing optical system as claimed in claim 1, wherein the predetermined range of aberration corresponds to a distance between a luminescence point of a light source and an optical recording medium.

7. The focusing optical system as claimed in claim 6, wherein the optical recording medium is a CD.

8. The focusing optical system as claimed in claim 1, wherein the predetermined range of aberration corresponds to a magnification of an objective lens.

9. The focusing optical system as claimed in claim 1, wherein the predetermined range of aberration corresponds to the distance between a luminescence point of a light source and an optical recording medium such that jitter and crosstalk is minimized.

10. The focusing optical system as claimed in claim 1, wherein the predetermined range of aberration corresponds to distance between a luminescence point of a light source and an optical recording medium such that the size of a reproducing signal is maximized.

11. An optical pickup apparatus for recording and reproducing various types of optical recording media having different recording formats such as different substrate thickness, comprising:

at least two light sources producing different wavelengths of light forming a light spot on an optical medium;

a focusing optical system including at least one collimator lens and an objective lens for focusing the light from the light sources onto the optical recording medium, wherein the focusing optical system is configured to generate a predetermined range of aberration in the light spot; and a receiving optical system for receiving light reflected from the optical recording medium and electrically converting the received light beam.

12. The focusing optical system of claim 11, wherein said focusing optical system is operable with a fixed numerical aperture of the objective lens.

13. The objective lens of claim 12, wherein the fixed numerical aperture is larger than the optimum numerical aperture for recording and reproducing optical recording media.

14. An optical pickup apparatus for recording and reproducing various types of optical recording media having a different recording format such as a different substrate thickness, comprising:

at least two light sources for a different wavelength of light beam;

a focusing optical system including at least one collimator lens and an objective lens for focusing the light beam from the light source onto the optical recording medium; and a receiving optical system for receiving a light beam reflected from the optical recording medium and for electrically converting the received light beam, wherein the apparatus generates a predetermined aberration in light spot focused on the optical recording medium corresponding to any one of the light sources by changing a magnification of the objective lens, allows the objective lens with an aperture number larger than the optimum aperture number for recording and reproducing the optical recording medium, and generates a light spot size suitable for recording and reproducing the optical recording medium.

* * * * *